(12) United States Patent
Martire

(10) Patent No.: US 11,029,046 B1
(45) Date of Patent: Jun. 8, 2021

(54) LOW-COST INDOOR TEMPERATURE SYSTEMS AND METHODS

(71) Applicant: Gianni Martire, New York, NY (US)

(72) Inventor: Gianni Martire, New York, NY (US)

( * ) Notice: Subject to any disclaimer, the term of this patent is extended or adjusted under 35 U.S.C. 154(b) by 0 days.

(21) Appl. No.: 16/930,272

(22) Filed: Jul. 15, 2020

(51) Int. Cl.
*F24F 5/00* (2006.01)

(52) U.S. Cl.
CPC .......... *F24F 5/005* (2013.01); *F24F 2203/12* (2013.01)

(58) Field of Classification Search
CPC ...... F24F 5/005; F24F 2203/12; F24F 5/0043; F24F 2005/0053; F24F 2005/0057; Y02B 10/40; Y02B 30/54
See application file for complete search history.

(56) References Cited

U.S. PATENT DOCUMENTS 2,109,926 A * 3/1938 Nelson .................... F24F 5/005
165/45

OTHER PUBLICATIONS

Tom Heylen,"DIY Air Heat exchanger-PVC pipe and Soda Cans", Youtube video, https://www.youtube.com/watch?v=baHbOtkbgwY (Year: 2015).*
Tom Heylen, "DIY Air Heat Exchanger—Made From Soda Cans and Pvc Pipe", summary of Youtube video "DIY Air Heat exchanger-PVC pipe and Soda Cans", https://www.instructables.com/Air-heat-exchanger-Made-from-soda-cans-and-pvc-pip/ (Year: 2021).*

* cited by examiner

*Primary Examiner* — Cassey D Bauer
(74) *Attorney, Agent, or Firm* — Cognition IP, P.C.; Edward Steakley

(57) ABSTRACT

An indoor cooling system kit can include aluminum beverage cans, flexible hoses, a fan, and instructions for forming the indoor cooling system. Further kit materials can include containers, dehumidifying material, a filter, and further instructions. A method of cooling an indoor region can include cutting tops and bottoms away from aluminum beverage cans, coupling the cans together in series to form two elongated airflow passages, coupling a flexible hose to open ends of both airflow passages, adjusting the hose so that both airflow passages and hose form a U-shaped airflow passage, forming a hole in the ground beneath the indoor region, inserting the U-shaped airflow passage into the hole with its inlet and outlet elevated out of the hole into the indoor region, and operating a fan to force air through the inlet. The air is cooled geothermally as it travels through the overall U-shaped airflow passage.

17 Claims, 5 Drawing Sheets

LOW-COST INDOOR TEMPERATURE SYSTEMS AND METHODS

TECHNICAL FIELD

The present disclosure relates generally to air cooling, and more particularly to low-cost indoor air-cooling systems and methods.

BACKGROUND

Many regions around the world can become particularly hot at times, and there are a variety of ways to cool indoor regions within homes, businesses, and other structures. Many cooling systems and methods involve the use of fans and air-conditioning systems of many types. While fans may be helpful, they are not the most efficient way to significantly lower temperatures in very hot indoor environments. While air-conditioning systems tend to be better than fans at lowering temperatures indoors, most traditional air-conditioning systems require significant costs to purchase, install, maintain, and operate. Unfortunately, these costs can be too much for poor individuals and states. As a result, there are many people in poor communities that suffer heat stroke and even die simply due to excessive heat.

Although traditional ways of cooling indoor regions have worked well in the past, improvements are always helpful. In particular, what is desired are low cost indoor cooling systems and methods that even the poorest individuals and communities are able to make, install, and use.

SUMMARY

It is an advantage of the present disclosure to provide low cost indoor cooling systems and methods that are easy to make, install, and use. The disclosed features, apparatuses, systems, and methods relate to indoor cooling solutions that involve collecting low cost or even free materials and creating do-it-yourself indoor cooling systems with the collected materials. The disclosed systems and methods take advantage of the fact that underground temperatures below five meters remain relatively constant throughout the year regardless of the temperatures above ground. Forcing hot indoor air underground where it is then cooled geothermally can be done virtually anywhere in the world with the systems and methods disclosed herein.

In various embodiments of the present disclosure, methods of cooling an indoor region can include various process steps. Pertinent process steps can include acquiring a collection of materials that includes at least aluminum beverage cans, a flexible hose, and a fan, forming a hole in the ground beneath the indoor region, cutting tops and bottoms away from the aluminum beverage cans, coupling the aluminum beverage cans together in series to form two elongated airflow passages, coupling the flexible hose to one end of both airflow passages, adjusting the flexible hose so that the airflow passages and hose form an overall U-shaped airflow passage, inserting the overall U-shaped airflow passage into the hole so that its inlet and outlet are elevated out of the hole and into the indoor region, partially or fully filling the hole with soil or other heat conducting material to at least cover the U-shaped airflow passage, and operating a fan to force air through the overall U-shaped airflow passage. Adjusting the flexible hose can result in the first elongated airflow passage being about parallel to the second elongated airflow passage. Air at a first temperature is forced through the inlet while the overall U-shaped airflow passage is in the hole, and the air is cooled geothermally as it travels through the overall U-shaped airflow passage and then exits the outlet at a second temperature that is lower than the first temperature, particularly when a sufficient amount of soil or other heat conducting material surrounds the overall U-shaped airflow passage. In some arrangements, it may be useful to at least partially form the overall U-shaped passage while a portion thereof is in the hole. The rate of airflow through the overall U-shaped airflow passage may also be varied and optimized, such as by using thermometers and/or a variable speed fan.

In various detailed embodiments, coupling the plurality of beverage cans together can include duct taping together the open tops and bottoms of the plurality of beverage cans. Also, the hole in the ground can have a depth that is greater than about four meters, and the hole can be filled with ground material after the overall U-shaped airflow passage is inserted into the hole. Additional process steps can include coupling a first end of a second flexible hose to the outlet of the overall U-shaped airflow passage and adjusting the second flexible hose so that air exiting the outlet is directed away from the fan and the inlet. Further process steps can include placing the second flexible hose and the inlet and outlet of the overall U-shaped airflow passage into a first container having openings at the bottom for the inlet and outlet, at the top for the fan, and at the side for the second flexible hose, and placing the fan atop the first container so that air from the fan is directed through the top opening and into the inlet. In some arrangements, the first container can be a five-gallon bucket.

In further detailed embodiments, additional process steps can include coupling the second end of the second flexible hose to a first opening of a second container having an internal height and an internal width, and arranging a dehumidifying material inside the second container such that air exiting the second end of the second flexible hose is forced through the dehumidifying material before exiting at a second opening of the second container. Coupling the second end of the second flexible hose to the second container can include coupling additional aluminum beverage cans together in series to form an intermediary airflow passage having opposed open ends, coupling the second end of the second flexible hose to one end of the intermediary airflow passage, and coupling the opposed end of the intermediary airflow passage to the first opening of the second container. The second container can be a plastic storage container having a lid, and further process steps can include removing lid to arrange the dehumidifying material and replacing the lid after arranging the dehumidifying material. The dehumidifying material can be a floral foam, and a filter can be installed at the second opening of the second container. In addition, all couplings can be made by way of duct tape or suitable equivalent.

In still further detailed embodiments, the dehumidifying material can be shaped into a first panel and a second panel that both have a height and a width that matches the internal height and the internal width of the second container, and coupling the first panel and the second panel to internal walls of the second container to form three separate compartments within the second container. Air entering at the first opening of the second container thus enters a first compartment, is forced through the first panel into a second compartment, and is then forced through the second panel into a third compartment before exiting at the second opening of the second container. Additional process steps can include further shaping the dehumidifying material into a third panel and a fourth panel having heights and widths that match the internal height and width of the second container, replacing the first panel and second panel with the third panel and fourth panel when the first panel and second panel become saturated with moisture, drying out the first panel and second panel, and replacing the third panel and fourth panel with the first panel and second panel when the first panel and second panel have dried out.

In various further embodiments of the present disclosure, methods of installing an indoor cooling system can include various process steps. A collection of acquired materials can include at least aluminum beverage cans, flexible hoses having opposed open ends, a fan, a first container, a second container, dehumidifying material, and a filter. Other variations on the foregoing process steps for cooling an indoor region can be included in the methods of installing an indoor cooling system.

In still further embodiments of the present disclosure, a low-cost indoor cooling system kit can include various materials. Such materials can include at least aluminum beverage cans, flexible hoses having opposed open ends, a fan, and instructions for forming a low-cost indoor cooling system using the kit materials. Additional kit materials can include a first container, a second container, dehumidifying material, a filter, and further instructions for forming an indoor cooling system using the additional materials. In some arrangements, the first container can be a five-gallon bucket, the second container can be a plastic storage container having a lid, and the dehumidifying material can be floral foam.

Other apparatuses, methods, features, and advantages of the disclosure will be or will become apparent to one with skill in the art upon examination of the following figures and detailed description. It is intended that all such additional apparatuses, methods, features and advantages be included within this description, be within the scope of the disclosure, and be protected by the accompanying claims.

BRIEF DESCRIPTION OF THE DRAWINGS

The included drawings are for illustrative purposes and serve only to provide examples of possible structures and arrangements for the disclosed low-cost indoor cooling systems and methods of installing, operating, and maintaining same. These drawings in no way limit any changes in form and detail that may be made to the disclosure by one skilled in the art without departing from the spirit and scope of the disclosure.

DETAILED DESCRIPTION

Figure 1:
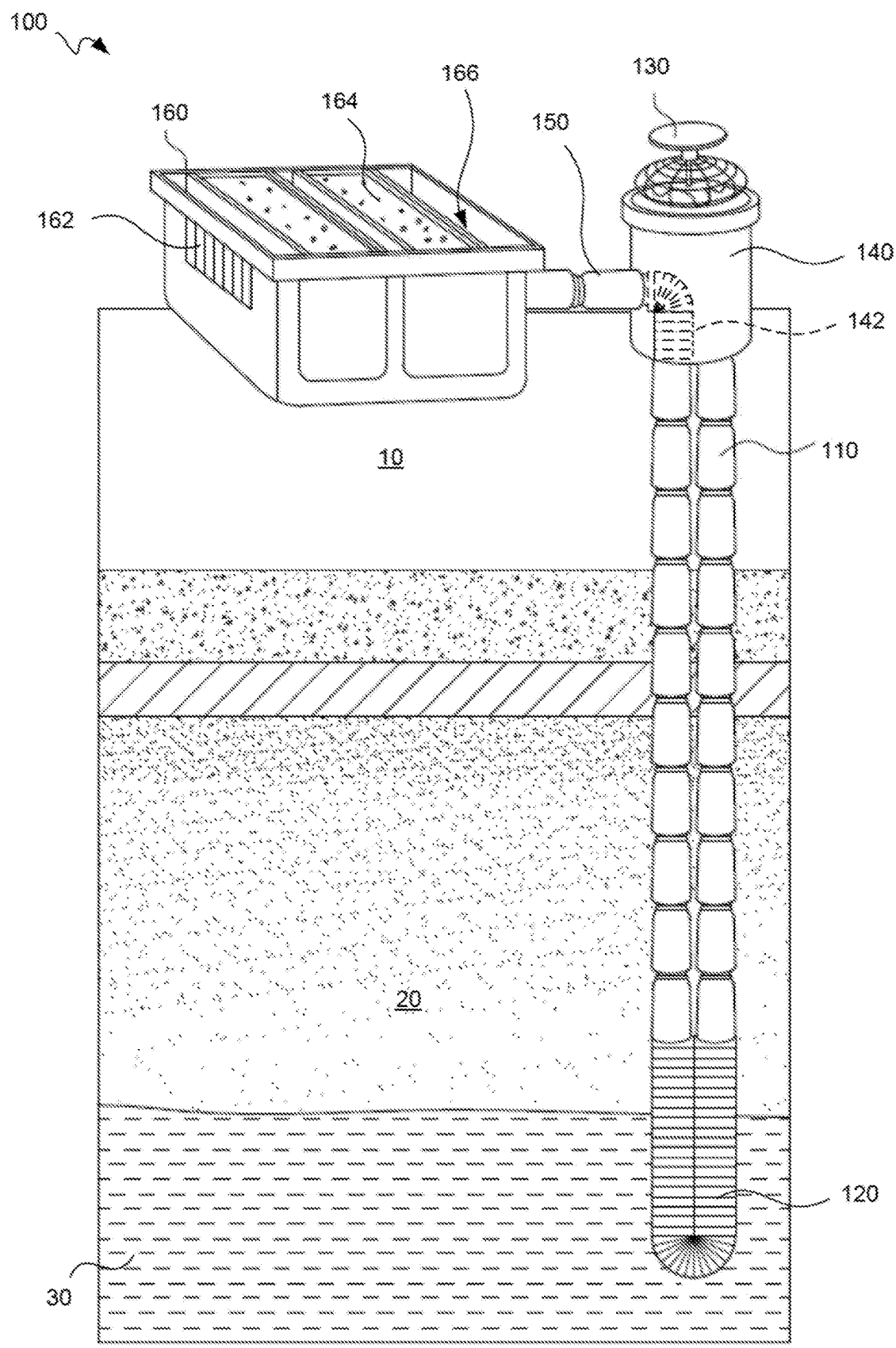
FIG. 1 illustrates in side perspective view an example low-cost indoor cooling system according to one embodiment of the present disclosure.

Exemplary applications of apparatuses, systems, and methods according to the present disclosure are described in this section. These examples are being provided solely to add context and aid in the understanding of the disclosure. It will thus be apparent to one skilled in the art that the present disclosure may be practiced without some or all of these specific details provided herein. In some instances, well known process steps have not been described in detail in order to avoid unnecessarily obscuring the present disclosure. Other applications are possible, such that the following examples should not be taken as limiting. In the following detailed description, references are made to the accompanying drawings, which form a part of the description and in which are shown, by way of illustration, specific embodiments of the present disclosure. Although these embodiments are described in sufficient detail to enable one skilled in the art to practice the disclosure, it is understood that these examples are not limiting, such that other embodiments may be used, and changes may be made without departing from the spirit and scope of the disclosure.

The present disclosure relates in various embodiments to features, apparatuses, systems, and methods for low-cost indoor cooling systems and methods that even the poorest communities are able to make, install, and use. The disclosed embodiments involve collecting low-cost or even free materials and creating, operating, and maintaining do-it-yourself indoor cooling systems with the collected materials. In particular, the disclosed systems and methods can cool the air in hot indoor spaces with temperatures above 25° C. through geothermal cooling. In general, ground below five meters maintains a nearly constant temperature throughout the year that is about the mean yearly surface temperature. Hot indoor air can be blown underground by a fan through at least a portion of the disclosed systems to return at a significantly cooler temperature. When humidity is an issue, the disclosed systems can be expanded to include a dehumidifying component before reintroducing the cooled air into the indoor region.

In various embodiments a series of coupled aluminum cans can loop underground, where the air cools down to below 25° C. from the walls of the loop and is then carried back up. The aluminum cans can maintain a thermal balance with the ground due to their thin walls, excellent thermal conductivity, and close contact with the ground. To avoid reheating the air on its way back up the loop, the loop can be insulated, such as by ground material of even Styrofoam for the last upper meter of return loop portion. For optimal ventilation of a modest dwelling with several people in it, loops ranging from 5 to 12 meters deep and airflows between 5 and 30 liters/second may be appropriate. Deeper loops lead to better cooling if desired. In some regions, underground water at about 10-15° C. may be available at depths ranging from few meters to more than 10 meters. Extending the loop into such underground water where available may further enhance the cooling by up to an additional 5° C. The aluminum can loop can be drastically shorter than conventional geothermal cooling systems thanks to its relatively larger cross-section and better wall conductivity. Conventional geothermal systems use thin air passages with thick walls made of insulating materials like polyvinylchloride plastics. In comparison, the disclosed cooling systems use thicker air passages with thin conductive walls, which are more suitable for heat transfer.

Where excessive humidity may be present in the hose due to underground water or otherwise, such humidity can be removed through dehumidifying materials added to the system. One or more layers of dehumidifying materials, such as floral foam, sponges, or the like, trap excess moisture as the cooled air is forced through one or more chambers containing the humidity absorbing layers. For improved use, maintenance on the system can include drying out and rotating the dehumidifying materials periodically, such as every couple of days. A standard HEPA filter can then be installed to filter the cooled and dehumidified air before reintroducing it into the indoor region being cooled.

Although various embodiments disclosed herein discuss forming a low-cost do-it-yourself indoor cooling system with aluminum cans, flexible hoses, duct tape, containers, floral foam, and/or a filter, it will be readily appreciated that the disclosed features, apparatuses, systems, and methods can similarly be with any suitable substitute or alternative materials that take advantage of geothermal cooling. For example, PVC piping or other discarded piping can be used instead of aluminum cans. Similarly, any other form of tape, glue, or fastener can be used in lieu of duct tape. Of course, other sizes and types of containers may be used, as well as other forms of dehumidifying materials. Other applications, arrangements, and extrapolations beyond the illustrated embodiments are also contemplated.

Referring first to FIG. 1, an example low-cost indoor cooling system is illustrated in side perspective view. Indoor cooling system 100 can be placed on the floor or ground 10 of an indoor environment and can have portions that go underground 20 to cool air geothermally. In some embodiments, underground water 30 may also exist for interaction with system 100. The underground loop can include two elongated airflow passages of aluminum beverage cans 110 coupled together in series, such as by duct tape or any other suitable coupling material, as well as a flexible hose 120 at the bottom, which can be coupled to both series of aluminum beverage cans, also by duct tape or other suitable coupling material. The aluminum can airflow passages 110 and flexible hose 120 combine to form an overall U-shaped airflow passage that is underground, with its inlet and outlet above ground.

At a minimum, a fan 130 can force heated air from the indoor region to be cooled into an inlet of the overall U-shaped airflow passage, after which the air is geothermally cooled by ground material 20 and possible underground water 30 where available. Fan 130 can be, for example, a discarded or recycled sufficiently powerful computer fan, or alternatively any other fan suitable for forcing air into the inlet of the overall U-shaped airflow passage. A hole in the ground can be formed directly from the indoor region to be cooled, and this hole can be partially or fully refilled with soil and/or other heat conducting material after the U-shaped airflow passage is inserted into the hole. In various embodiments, the hole can be at least four meters deep. Of course, shorter holes can result in less opportunity for the hot air to be geothermally cooled, while deeper holes can result in greater cooling.

In some embodiments, a first container 140 can be placed above ground to situate the fan 130 and focus its effect on the inlet of the overall U-shaped airflow passage. If needed, holes can be formed in the bottom of first container 140 to accommodate the inlet and outlet of the overall U-shaped airflow passage. In addition, an additional hole can be formed in first container 140, such as on a side of the container, to accommodate an air flow outlet. A second flexible hose 142 can be coupled to the overall U-shaped outlet to the additional hole of first container 140, such that cooled air can be directed out of the container without mixing with the hot air being blown into the inlet of the U-shaped airflow passage. These couplings can also be made using duct tape or any other suitable coupling material. First container 140 can be, for example, a five-gallon bucket. Alternatively, any other suitable container may be used for first container 140.

In some embodiments, such as where humidity may be a factor, an additional air passage 150 can couple first container 140 to second container 160 in order to at least partially dehumidify the cooled air exiting first container 140. Additional air passage 150 can be another series of aluminum beverage cans, for example, or alternatively can be another hose or any other suitable airflow passage. Again, couplings for each of these items can be by way of duct tape or any other suitable coupling material. Second container 160 can have a removable lid (not shown), an inlet opening on one side coupled to additional air passage 150, and an outlet opening on another side, which may be fitted with a filter 162. This filter 162 can be a HEPA filter, for example. Second container 160 can serve as a dehumidifier, and as such can contain one or more dehumidifying materials 164, which can be formed from, for example, floral foam or any other suitable dehumidifier. Second container 160 can be, for example, a plastic storage tote with a lid. Alternatively, any other suitable container may be used for second container 160.

In some embodiments, dehumidifying material 164 can be shaped into panels having a height and width that match the height and width of the second container 160. These panels can then be arranged in series and coupled to internal walls of the second container 160, such that separate air chambers 166 are created within the second container. In this manner, and when the lid is replaced atop the second container 160, cooled air coming the second container from the additional air passage 150 enters a first air chamber 166, where it is forced to pass through one dehumidifying panel into a second air chamber, where it is then forced to pass through another dehumidifying panel into a third air chamber before exiting the second container through filter 162. Additional dehumidifying panels 164 may be added as desired to created additional air chambers and increased dehumidifying effects. Alternatively, only one dehumidifying panel might be used in some embodiments. Maintenance on system 100 may involve rotating out dehumidifying panels 164 when they become saturated, as detailed below.

Figure 2:
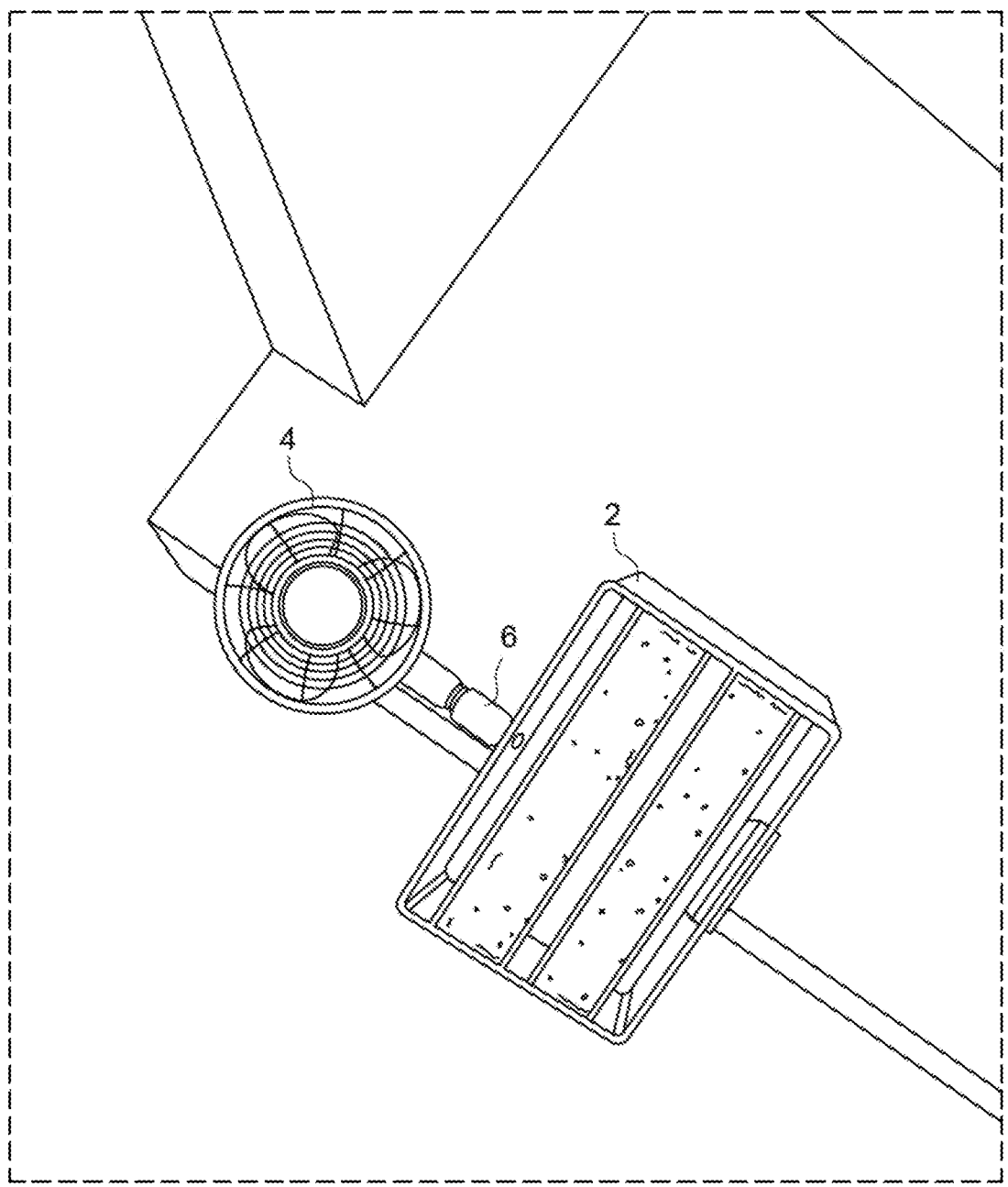
FIG. 2 illustrates in top plan view the low-cost indoor cooling system of FIG. 1 according to one embodiment of the present disclosure.

Continuing with FIG. 2 the low-cost indoor cooling system of FIG. 1 is shown in top plan view. Indoor cooling system 100 is shown here from a different angle to provide additional perspective and for purposes of clarity. Again, fan 130 can force heated indoor air underground through an overall U-shaped airflow passage (not shown), after which cooled air can travel through additional air passage 150 and into second container 160 via second container inlet hole 168. The cool air is then forced through a series of dehumidifying panels 164 that form separate air chambers 166 in the second container 160, after which the cooled and dehumidified air exits system 100 into the indoor region through filter 162.

Indoor cooling system 100 can be assembled in a variety of ways and order of steps, and one non-limiting example will be described here for purposes of illustration. Each aluminum can air passage can be constructed by coupling together a series of 0.33-liter aluminum beverage cans, such as with duct tape. Prior to so coupling, the top and the bottom of each of the aluminum cans can be removed, such as with a can opener, scissors, or other suitable removal means. A flexible hose can be coupled at both ends to ends of two elongated aluminum can air passages to provide better manageability for an adjoining U curve at the bottom of the underground loop. This flexible hose can be, for example, a one-meter long piece of standard 4-inch diameter dryer vent hose, although other suitable hoses may also be used. Coupling a series of aluminum beverage cans to a 4-inch diameter dryer vent hose, or any other alternative flexible hose having a different diameter than typical aluminum beverage cans, can involve bending the hose and taping it, for example, or any other suitable adjustment to account for different diameters between the flexible hose and cans. If the system is to be used where groundwater is present, a waterproof tape may be used to prevent leakage, and gravel may also be placed at the bottom of the ground opening to counteract any buoyancy force from the water. In various embodiments, the ground hole or opening can be at least 35 cm in diameter and at least 4 meters deep and can be formed from within the dwelling or other indoor region to be cooled.

Figure 3:
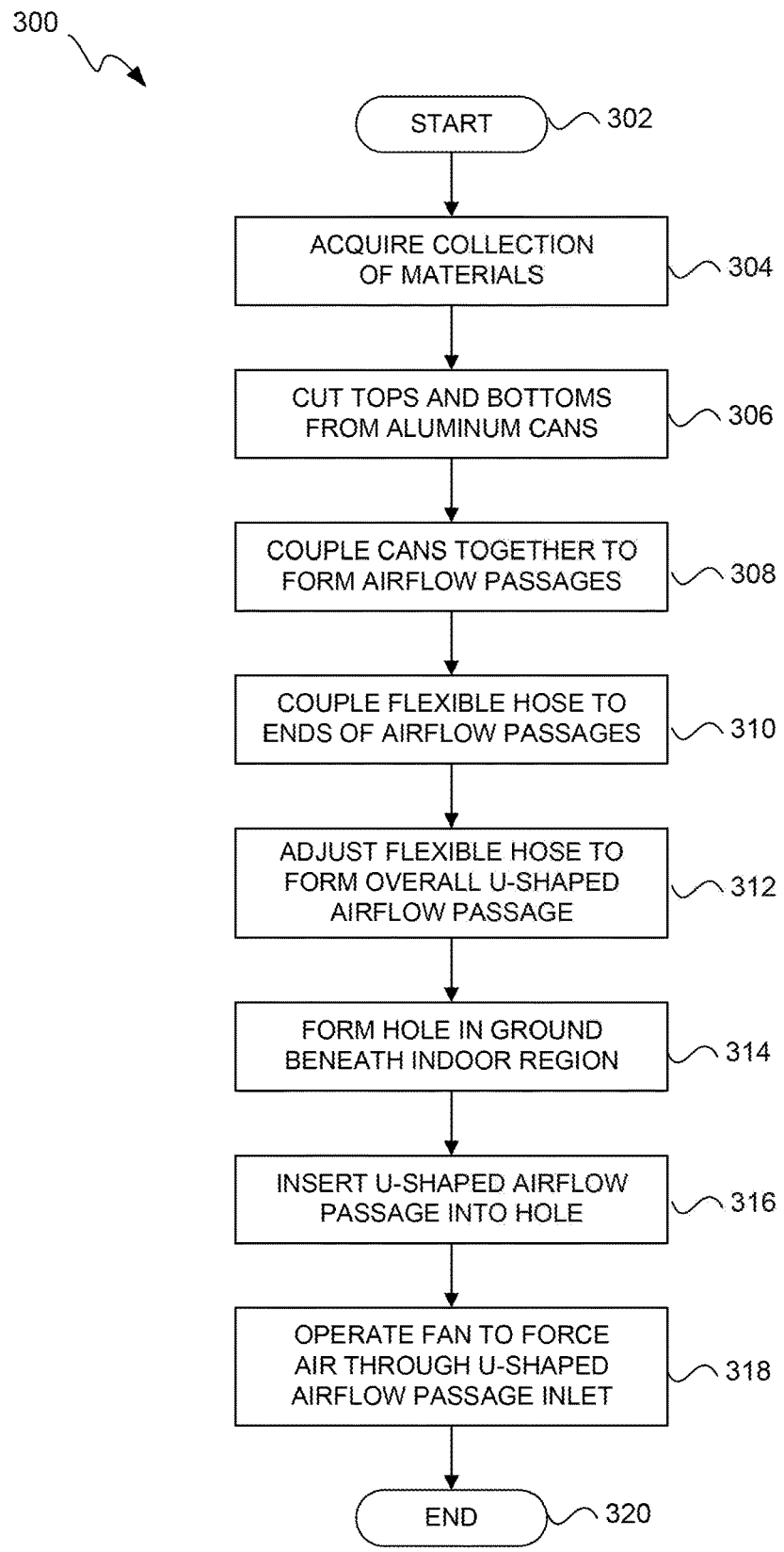
FIG. 3 illustrates a flowchart of an example method of installing an indoor cooling system and cooling an indoor region therewith according to one embodiment of the present disclosure.

Turning next to FIG. 3, a flowchart of an example method 300 of installing an indoor cooling system and cooling an indoor region therewith is provided. After a start step 302, a collection of materials can be acquired at process step 304. Again, this collection of materials can include at least aluminum beverage cans, a first flexible hose having opposed open ends, and a fan, or similarly suitable materials. Further items for the collection of materials can include a second flexible hose, a first container, a second container, dehumidifying material, and a filter. These materials can be new, recycled, discarded, or any combination thereof.

At the next process step 306, the tops and bottoms of the aluminum cans can be cut away, such that each can forms a thin cylindrical air passage. This can be done using a can opener, scissors, or any other suitable item for removing the tops and bottoms from the cans. The cans can then be coupled together to form airflow passages at process step 308. This can be done using duct tape or any other suitable tape or coupling material. In some arrangements, there can be two elongated airflow passages, and in others an additional shorter airflow passage can be formed.

At following process step 310, a flexible hose can be coupled to ends of the elongated airflow passages. The flexible hose can be a dryer hose, for example, and the coupling can be accomplished by way of duct tape or any other suitable tape or coupling material. In the event that groundwater is expected to be an issue, a sealing tape can be used. Alternatively, the couplings and lengths of the elongated airflow passages can be adjusted such that only the flexible hose enters any groundwater. In this manner, any small leaks in the duct taping or other couplings will not allow internal flooding.

At subsequent process step 312, the flexible hose can be adjusted such that the elongated aluminum can airflow passages and hose combine to form an overall U-shaped airflow passage. At process step 314, a hole can be formed in the ground beneath the indoor region to be cooled, and the overall U-shaped airflow passage can be inserted into the ground hole at process step 316. This insertion can result in most of the U-shaped airflow passage being underground, with only the inlet and outlet being elevated above ground, such as within the dwelling or other indoor region to be cooled.

In some arrangements, the hole can be formed in the ground first and at least a portion of the overall U-shaped airflow passage can be formed while some of the overall U-shaped airflow passage is already inserted in the hole. For example, a formed bottom portion of the overall U-shaped airflow passage can be inserted into the hole and remaining aluminum beverage cans can be added to this formed bottom portion until the entire U-shaped airflow passage is formed. This can avoid cumbersome situations with forming entire 4+ meter-long airflow passages inside the indoor region to be cooled before inserting the entire U-shaped airflow passage into the hole. Soil and/or other heat conducting material may also be inserted into the hole after the entire U-shaped airflow passage is inserted or formed therein.

At the next process step 318, a fan can be operated to force air through the overall U-shaped airflow passage inlet while the overall U-shaped airflow passage is in the hole. The air is then cooled geothermally as it travels through the overall U-shaped airflow passage and exits the outlet of the U-shaped airflow passage above ground at a temperature that is lower than the inlet temperature. The method then ends at end step 320.

Figure 4:
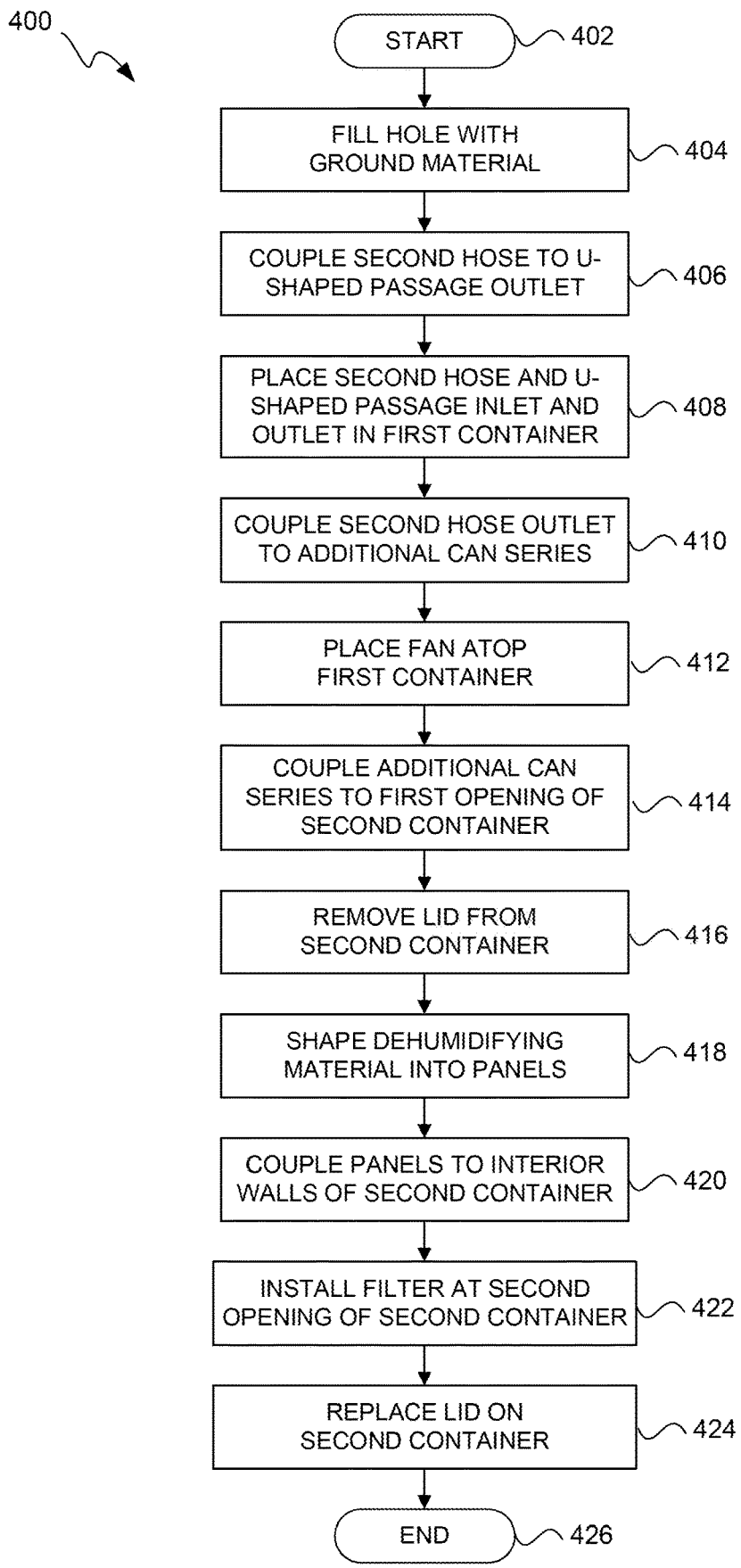
FIG. 4 illustrates a flowchart of an example method of improving the indoor cooling system installed in the method of FIG. 3 according to one embodiment of the present disclosure.

FIG. 4 illustrates a flowchart of an example method 400 of improving the indoor cooling system installed in the method of FIG. 3. After a start step 402, the ground hole can be filled with ground material at process step 404. The hole can be filled with just dirt in some arrangements, while other arrangements can include one or more additional materials, such as an insulating Styrofoam. Where there is groundwater, gravel may be placed at the bottom of the hole before filling the rest with dirt.

At the next process step 406, a second flexible hose can be coupled to the overall U-shaped airflow passage outlet. This can include adjusting the second flexible hose so that air exiting the outlet is directed away from the fan and the inlet. Again, such a second flexible hose can also be a dryer hose or any other suitable flexible material providing an airflow passage therethrough.

At the next process step 408, the second flexible hose and overall U-shaped airflow passage inlet and outlet can be placed inside a first container. The first container can thus have openings at the bottom for the inlet and outlet, at the top for the fan, and at the side for the second flexible hose. In some arrangements, the first container can be a five-gallon bucket.

At subsequent process step 410, the outlet of the second flexible hose can be coupled to an additional aluminum can series. This can include coupling additional aluminum beverage cans together in series to form an intermediary airflow passage having opposed open ends, wherein air forced into one open end flows through the intermediary airflow passage and exits at the opposed open end. The second end of the second flexible hose can then be coupled to one end of the intermediary airflow passage, such as through the additional opening in the first container.

At the next process step 412, the fan can be placed atop the first container so that air from the fan is directed through the top opening of the first container and into the inlet of the overall U-shaped airflow passage. This arrangement with the first container and second flexible hose directing cooled airflow from the U-shaped airflow passage outlet out of the first container can result in a more focused effort of the fan to force air only into the U-shaped airflow passage inlet without mixing hot and cool air.

At following step 414, the additional can series forming an intermediary airflow passage can be coupled to a first opening of a second container. In some arrangements, the second container can be a plastic storage tote with a lid, or any other suitable container. As in all of the foregoing couplings, this coupling can also be formed using duct tape or any other tape or suitable coupling material. A lid can be removed from the second container at process step 416.

At process step 418, dehumidifying material can be shaped into panels. These can be first and second panels that both have a height and a width that matches the internal height and the internal width of the second container. The panels of dehumidifying material can then be coupled to interior walls of the second container at process step 420. While this coupling may also by way of duct tape, another arrangement can involve coupling brackets or other suitable guides to the internal walls of the second container such that the panels are held in place by the brackets or guides. This can allow for a more ready insertion and removal of the panels, such as during maintenance. By arranging the panels in series, this can result in separate air chambers within the second container, as noted above.

At the next process step 422, a filter can be installed at a second opening of second container. The second opening can be an outlet from the second container and overall system into the indoor region. The filter can be a standard HEPA filter, or any other suitable filter to assist with providing cleaner cooled and dehumidified air. At the next process step 424, the lid can be replaced onto the second container, such that air is forced through the dehumidifying materials and filter before it can enter the indoor region. The method then ends at end step 426.

Figure 5:
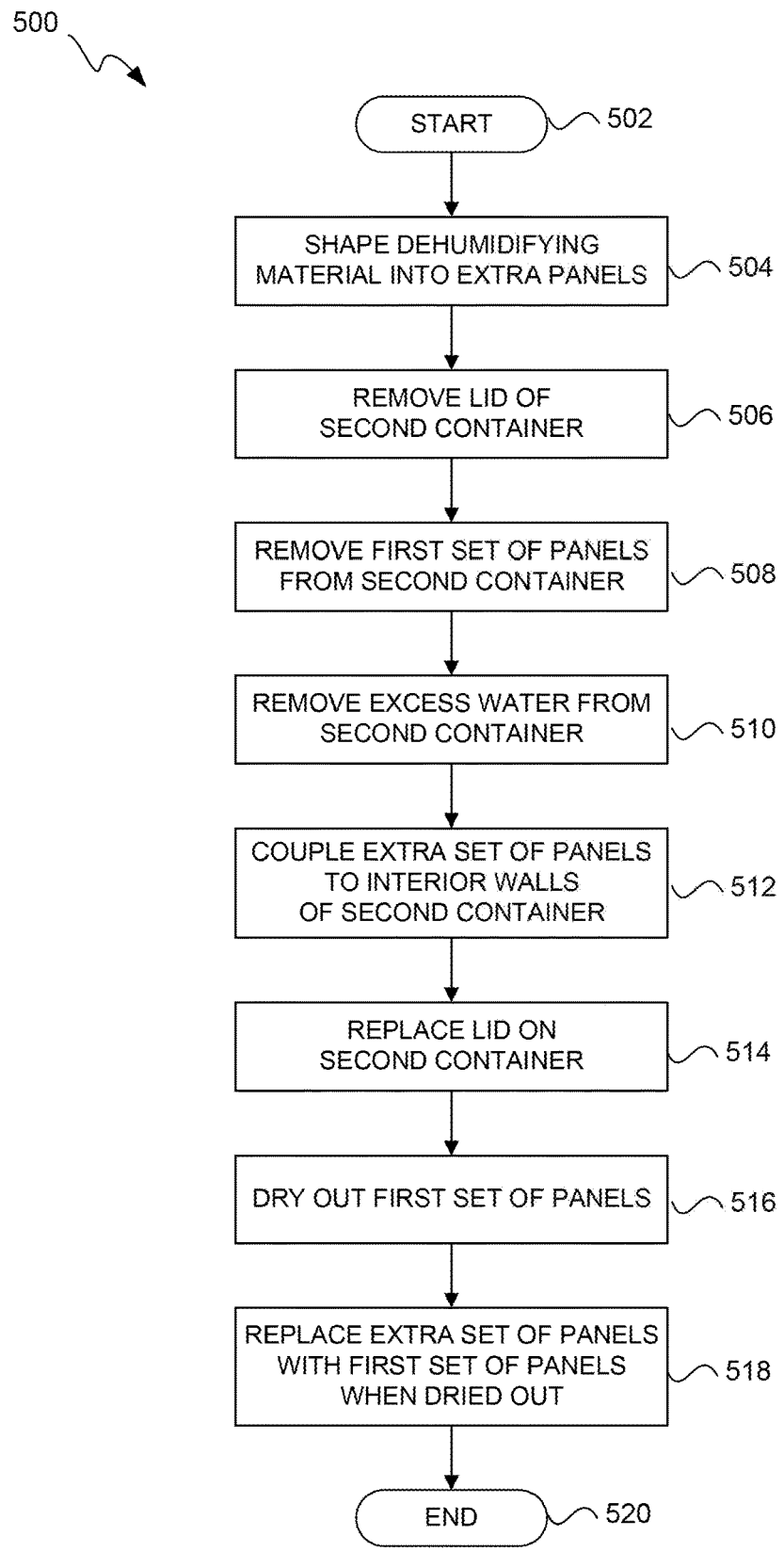
FIG. 5 illustrates a flowchart of an example method of performing maintenance on an indoor dehumidifying system according to one embodiment of the present disclosure.

Lastly, FIG. 5 provides a flowchart of an example method 500 of performing maintenance on an indoor dehumidifying system. After a start step 502, dehumidifying material can be shaped into extra panels at process step 504. For example, the dehumidifying material can be shaped into third and fourth panels that both have a height and width that matches the internal height and width of the second container.

At process step 506, the lid of second container can be removed, and the first set of panels (i.e., first and second panels) can be removed from the second container when they become saturated with moisture at process step 508. At the following process step 510, excess water from the second container can be removed.

At the next process step 512, the extra set of panels (i.e., third and fourth panels) can be coupled to the interior walls of second container. Again, this can be by way of duct tape or any other suitable fastener. In some arrangements, as noted above, this coupling can be aided by way of brackets or guides fastened to the interior walls, which brackets or guides can remain in place when the first set of panels is removed. At the next process step 514, the lid on the second container can be put back in place.

At subsequent process step 516, the moisture saturated first set of panels can be dried out. This can simply involve placing them out in the sun to dry. At the next process step 518, the extra set of dehumidifying panels can be replaced with the first set of dehumidifying panels when the first set of panels has dried out. As will be appreciated, this cycle can then be repeated with the extra set of panels drying out while the first set is in use within the second container. The method then ends at end step 520.

For the foregoing methods, it will be appreciated that not all process steps are necessary, and that other process steps may be added in some arrangements. Furthermore, the order of steps may be altered in some cases, and some steps may be performed simultaneously. For example, step 314 may be performed at any time in the method prior to step 316 for method 300. As another example, process step 418 can be performed at any time in method 400 before process step 420, or even at any time during method 300. Step 418 can also be performed concurrently with any preceding step. As also noted above, it may be preferable to form at least a portion of the overall U-shaped airflow passage while another already formed portion of the overall U-shaped airflow passage is already inserted into the hole. Other variations and extrapolations of the disclosed methods will also be readily appreciated by those of skill in the art.

Although the foregoing disclosure has been described in detail by way of illustration and example for purposes of clarity and understanding, it will be recognized that the above described disclosure may be embodied in numerous other specific variations and embodiments without departing from the spirit or essential characteristics of the disclosure. Certain changes and modifications may be practiced, and it is understood that the disclosure is not to be limited by the foregoing details, but rather is to be defined by the scope of the appended claims.

What is claimed is:

1. A method of cooling an indoor region, the method comprising:
   - acquiring a collection of materials to build an indoor cooling system, wherein the collection of materials includes aluminum beverage cans, a first flexible hose having opposed open ends, and a fan;
   - forming a hole in the ground beneath the indoor region;
   - cutting tops and bottoms away from the aluminum beverage cans;
   - coupling the aluminum beverage cans together in series to form first and second elongated airflow passages having opposed open ends, wherein air forced into one open end flows through an airflow passage and exits at the opposed open end;
   - coupling a first flexible hose to a first open end of the first elongated airflow passage and to a first open end of the second elongated airflow passage, wherein air forced into the second open end of the first elongated airflow passage flows through the first elongated airflow passage, the first flexible hose, and the second elongated airflow passage, and exits at the second open end of the second elongated airflow passage;
   - adjusting the first flexible hose so that the first elongated airflow passage is about parallel to the second elongated airflow passage and the first flexible hose forms a U-shape between the first and second elongated airflow passages to create an overall U-shaped airflow passage with both second open ends forming an inlet and an outlet to the overall U-shaped airflow passage that are arranged in about the same directional orientation;
   - inserting the overall U-shaped airflow passage into the hole so that the inlet and outlet are elevated out of the hole and into the indoor region; and
   - operating the fan to force air at a first temperature through the inlet while the overall U-shaped airflow passage is in the hole, wherein the air is cooled geothermally as it travels through the overall U-shaped airflow passage and exits the outlet at a second temperature that is lower than the first temperature.

2. The method of claim 1, wherein coupling the plurality of beverage cans together includes duct taping together the open tops and bottoms of the plurality of beverage cans.

3. The method of claim 1, wherein coupling the aluminum beverage cans together in series includes coupling at least a portion of the aluminum beverage cans together after a portion of the overall U-shaped airflow passage has already been inserted into the hole.

4. The method of claim 1, further comprising the step of:
   - filling the hole with ground material after inserting the overall U-shaped airflow passage into the hole.

5. The method of claim 1, further comprising the steps of:
   - coupling a first end of a second flexible hose having opposed open ends to the outlet; and adjusting the second flexible hose so that air exiting the outlet is directed away from the fan and the inlet.

6. The method of claim 5, further comprising the steps of:
placing the second flexible hose and the inlet and outlet of the overall U-shaped airflow passage into a first container, the first container having openings at the bottom for the inlet and outlet, at the top for the fan, and at the side for the second flexible hose; and
placing the fan atop the first container so that air from the fan is directed through the top opening and into the inlet.

7. The method of claim 6, wherein the first container is a five-gallon bucket.

8. The method of claim 6, further comprising the steps of:
coupling the second end of the second flexible hose to a first opening of a second container having an internal height and an internal width; and
arranging a dehumidifying material inside the second container such that air exiting the second end of the second flexible hose is forced through the dehumidifying material before exiting at a second opening of the second container.

9. The method of claim 8, wherein the step of coupling the second end of the second flexible hose to a first opening of a second container includes:
coupling additional aluminum beverage cans together in series to form an intermediary airflow passage having opposed open ends, wherein air forced into one open end flows through the intermediary airflow passage and exits at the opposed open end;
coupling the second end of the second flexible hose to one end of the intermediary airflow passage; and
coupling the opposed end of the intermediary airflow passage to the first opening of the second container.

10. The method of claim 9, wherein the second container is a plastic storage container having a lid, and further comprising the steps of:
removing lid to arrange the dehumidifying material; and
replacing the lid after arranging the dehumidifying material.

11. The method of claim 10, further comprising the steps of:
shaping the dehumidifying material into a first panel and a second panel, wherein both the first panel and second panel have a height and a width that matches the internal height and the internal width of the second container; and
coupling the first panel and the second panel to internal walls of the second container to form three separate compartments within the second container, wherein air entering at the first opening of the second container enters a first compartment, is forced through the first panel into a second compartment, and is forced through the second panel into a third compartment before exiting at the second opening of the second container.

12. The method of claim 8, further comprising the steps of:
further shaping the dehumidifying material into a third panel and a fourth panel, wherein both the third panel and fourth panel have a height and a width that matches the internal height and the internal width of the second container;
replacing the first panel and second panel with the third panel and fourth panel when the first panel and second panel become saturated with moisture;
drying out the first panel and second panel; and
replacing the third panel and fourth panel with the first panel and second panel when the first panel and second panel have dried out.

13. The method of claim 8, wherein the dehumidifying material is floral foam.

14. The method of claim 8, further comprising the step of:
installing a filter at the second opening of the second container.

15. A method of installing an indoor cooling system, the method comprising:
acquiring a collection of materials to build an indoor cooling system, wherein the collection of materials includes aluminum beverage cans, flexible hoses having opposed open ends, a fan, a first container, a second container, dehumidifying material, and a filter;
forming a hole in the ground beneath an indoor region to be cooled, the hole having a depth of at least four meters;
cutting tops and bottoms away from the aluminum beverage cans;
duct taping the aluminum beverage cans together in series to form first and second elongated airflow passages having opposed open ends, wherein air forced into one open end flows through an airflow passage and exits at the opposed open end;
duct taping a first flexible hose to a first open end of the first elongated airflow passage and to a first open end of the second elongated airflow passage, wherein air forced into the second open end of the first elongated airflow passage flows through the first elongated airflow passage, the first flexible hose, and the second elongated airflow passage, and exits at the second open end of the second elongated airflow passage;
adjusting the first flexible hose so that the first elongated airflow passage is about parallel to the second elongated airflow passage and the first flexible hose forms a U-shape between the first and second elongated airflow passages to create an overall U-shaped airflow passage with both second open ends forming an inlet and an outlet to the overall U-shaped airflow passage that are arranged in about the same directional orientation;
inserting the overall U-shaped airflow passage into the hole so that the inlet and outlet are elevated out of the hole and into the indoor region;
filling the hole with ground material after inserting the overall U-shaped airflow passage into the hole;
coupling a first end of a second flexible hose to the outlet of the overall U-shaped airflow passage;
placing the second flexible hose and the inlet and outlet of the overall U-shaped airflow passage into the first container, the first container having openings at the bottom for the inlet and outlet, at the top for the fan, and at the side for the second flexible hose;
placing the fan atop the first container so that air from the fan is directed through the top opening and into the inlet;
coupling the second end of the second flexible hose to a first opening of the second container, the second container having an internal height and an internal width;
shaping the dehumidifying material into a first panel and a second panel, wherein both the first panel and second panel have a height and a width that matches the internal height and the internal width of the second container;
coupling the first panel and the second panel to internal walls of the second container to form three separate compartments within the second container, wherein air entering at the first opening of the second container enters a first compartment, is forced through the first panel into a second compartment, and is forced through the second panel into a third compartment before exiting at the second opening of the second container;

installing the filter at the second opening of the second container; and operating the fan to force air at a first temperature into the indoor cooling system through the inlet of the overall U-shaped airflow passage, wherein the air is cooled geothermally as it travels through the overall U-shaped airflow passage, exits the outlet of the overall U-shaped airflow passage at a second temperature that is lower than the first temperature, and is dehumidified by the dehumidifying material before exiting the indoor cooling system at the filter.

16. The method of claim 15, wherein duct taping the aluminum beverage cans together in series includes duct taping at least a portion of the aluminum beverage cans together after a portion of the overall U-shaped airflow passage has already been inserted into the hole.

17. The method of claim 15, wherein the step of coupling the second end of the second flexible hose to a first opening of a second container includes:
coupling additional aluminum beverage cans together in series to form an intermediary airflow passage having opposed open ends, wherein air forced into one open end flows through the intermediary airflow passage and exits at the opposed open end;
coupling the second end of the second flexible hose to one end of the intermediary airflow passage; and
coupling the opposed end of the intermediary airflow passage to the first opening of the second container.

* * * * *